UNITED STATES PATENT OFFICE.

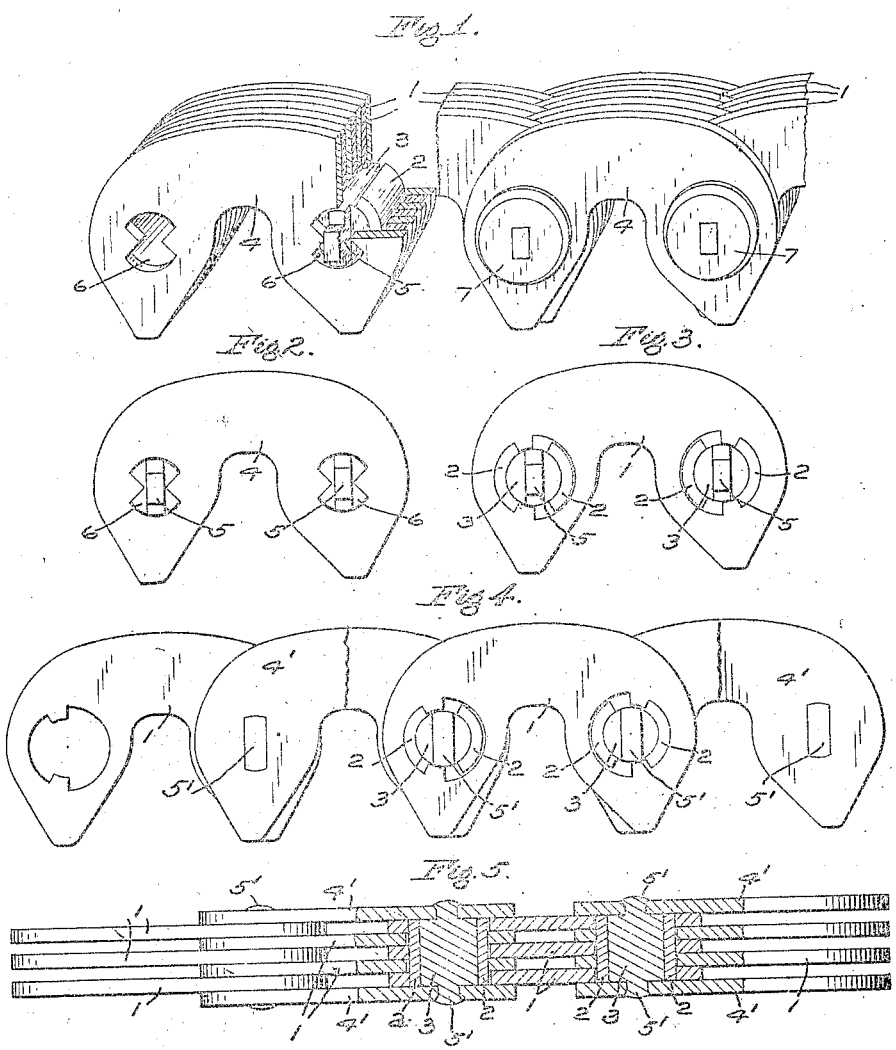

FRANK L. MORSE, OF ITHACA, NEW YORK, ASSIGNOR TO MORSE CHAIN COMPANY, OF ITHACA, NEW YORK, A CORPORATION OF NEW YORK.

DRIVE-CHAIN.

953,429.     Specification of Letters Patent.     Patented Mar. 29, 1910.

Application filed June 27, 1908. Serial No. 440,734.

*To all whom it may concern:*

Be it known that I, FRANK L. MORSE, a citizen of the United States, residing at Ithaca, in the county of Tompkins and State of New York, have invented new and useful Improvements in Drive-Chains, of which the following is a specification.

This invention relates to drive chains more particularly for power transmission purposes and of the multiplate type in which the links are formed of a plurality of plates adapted to arch over the sprockets, the plates of each link being interspersed upon the pintles with the plates of the adjacent links. Chains of this type have heretofore been provided with three part pintles comprising two side parts or bushings having concave bearing surfaces and a central pivot pin located between the two side bushings and bearing upon the same throughout the full width of the chain, the pintle parts extending through apertures in the ends of the plates comprising adjacent links, and the apertures in the plates of one link being formed to hold in place one of the side pintle parts or bushings and permit the free movement of the other pintle parts, and the apertures in the plates of the adjacent link holding in place the other side pintle part and allowing free movement of the other parts, all as shown and described in prior patents to Dodge Nos. 761,034 and 761,037 of May 24, 1904. In this construction however the central cylindrical pivot pin member of the three part pintle joint has been free to turn throughout a complete revolution and in fact sometimes does have a substantially continuous rotary movement in one direction during the operation of the chain. During this movement dirt is liable to accumulate and work into the joint, and the principal object of my present invention is to provide improved means for preventing such complete or continuous rotary movement of the central cylindrical pin of the pintle.

In the accompanying drawing Figure 1 is a perspective view of several links of a multiplate chain embodying one form of my improvement, a portion of two of the links being cut away to more clearly show the parts of the joint; Fig. 2 a side elevation of one link with washers removed showing the form of apertures in the outside plate; Fig. 3 a similar view of the link with the outside plate removed; Fig. 4 a side elevation of several links of a chain showing a modified form of means for restraining the central pin of the pintle from turning freely or completely around in its bearing in the side parts of the pintle; and Fig. 5 a plan view of the same, partly in horizontal section.

As shown in Figs. 1, 2 and 3, the links of the chain are composed of a plurality of arch shaped plates 1, the plates of each link being interspersed upon the pintles with the plates of the adjacent links, and having apertures at their ends through which the pintle parts extend. These pintles are formed in three parts, comprising two similar side parts or bushings 2 and a central cylindrical pin 3 bearing in said side parts of the pintle.

The apertures in the plates of each of the two adjacent links are formed to hold in place and turn with one of the side pintle parts or bushings 2 and permit free movement of the other parts during the flexing of the joint, and these side bushings extend through all of the plates except the outside plate 4 of alternate links. These outside plates 4 are provided with restricted apertures 6 such as shown in Figs. 1 and 2, and the central pin member 3 of the pintle has a shouldered end 5 which extends out through the restricted aperture 6 and thereby permits a partial rotary or oscillating movement of the central pin but prevents a free and complete rotary movement of the same. The shouldered ends 5 of the central pin member may also extend sufficiently to be riveted to the outside washers 7 for holding the parts of the chain together.

As shown in the modification illustrated in Figs. 4 and 5, the shoulders 5' at the ends of the central pin member of the pintle are adapted to fit the apertures in the outside plate 4' of the alternate links and be riveted thereto, thereby dispensing with the washers while at the same time restraining the central pin member 3 from turning relative to these alternate outside links. In this form of construction the only relative movement that can occur between the pintle parts, as the joint bends during the passing on to and off from the sprocket wheels in the operation of the chain, will be between the central pin and the side bushing 2 that is carried by the plates 1 of the intermediate link.

It will be obvious that various other forms of means may be designed in accordance with the spirit of my invention, for preventing the free and complete rotary movement of the central pin member of the pintle while permitting a limited rotary or oscillating movement thereof.

Having now described my invention, what I claim as new and desire to secure by Letters Patent is:—

1. A drive chain having links composed of a plurality of plates provided with apertures at their ends, three part pintles extending through said apertures and comprising two side parts or bushings and a central cylindrical pin normally free to turn upon one of the bushings, and means for restraining said central pin from making a free and complete rotary movement.

2. A drive chain having links composed of a plurality of plates provided with apertures at their ends, three part pintles extending through said apertures and comprising two side parts or bushings and a central cylindrical pin normally free to turn upon one of the bushings, and means for preventing a complete rotation of the central pin but allowing a partial rotary or oscillating movement of the same.

3. A drive chain having links composed of a plurality of plates provided with apertures at their ends, three part pintles extending through said apertures and comprising two side parts or bushings and a central cylindrical pin, the apertures in the outside link plates being so formed as to prevent the complete rotation of the central pin.

4. A drive chain having links composed of a plurality of plates provided with apertures at their ends, three part pintles extending through said apertures and comprising two side parts or bushings and a central cylindrical pin, some of the plates having apertures so formed as to prevent the complete rotary movement of the central pin.

5. A drive chain having links composed of a plurality of plates provided with apertures at their ends, three part pintles extending through said apertures and comprising two side parts or bushings and a central cylindrical pin having a shouldered end extending through an aperture in an outside plate, the said aperture being so formed as to prevent a complete rotary movement of the said pin.

6. A drive chain having links composed of a plurality of plates provided with apertures at their ends, three part pintles extending through said apertures and comprising two side parts or bushings and a central cylindrical pin having shouldered ends extending through restricted apertures in the outside link plates, and washers riveted upon the said shouldered ends outside the plates.

In testimony whereof I have hereunto set my hand.

FRANK L. MORSE.

Witnesses:
R. F. EMERY,
WM. M. CADY.